(12) United States Patent
Kirk (10) Patent No.: US 7,653,976 B1
(45) Date of Patent: Feb. 2, 2010

(54) METHOD OF REPAIRING A FISHING ROD

(76) Inventor: David J. Kirk, P.O. Box 29496, Bellingham, WA (US) 99228-1496

( * ) Notice: Subject to any disclaimer, the term of this patent is extended or adjusted under 35 U.S.C. 154(b) by 858 days.

(21) Appl. No.: 10/953,220

(22) Filed: Sep. 28, 2004

Related U.S. Application Data (62) Division of application No. 10/794,069, filed on Mar. 4, 2004, now Pat. No. 7,225,581.

(51) Int. Cl.
*B29C 73/00* (2006.01)
*A01K 87/04* (2006.01)

(52) U.S. Cl. ............... 29/402.01; 29/402.09; 29/402.17; 43/24

(58) Field of Classification Search ............ 43/24; 29/402.01, 402.09, 402.17, 456; 285/24, 285/328, 355; 403/184, 343; 138/97
See application file for complete search history.

(56) References Cited

U.S. PATENT DOCUMENTS

| | | | |
|---|---|---|---|
| 1,463,084 A * | 7/1923 | Hudson | 403/182 |
| 1,473,437 A * | 11/1923 | Lindstrom | 43/24 |
| 1,984,349 A * | 12/1934 | Gurrieri et al. | 43/24 |
| 3,389,046 A * | 6/1968 | Burress | 428/371 |
| 3,722,130 A * | 3/1973 | Handl | 43/44.98 |
| 3,878,012 A * | 4/1975 | Williams | 156/94 |
| 4,860,485 A * | 8/1989 | Rhoton et al. | 43/24 |
| 4,875,710 A * | 10/1989 | Mercado | 285/24 |
| 5,125,147 A * | 6/1992 | Hickham | 29/402.09 |
| 5,647,162 A * | 7/1997 | Akiba et al. | 43/24 |
| 6,164,702 A * | 12/2000 | Hauber et al. | 285/21.2 |
| 6,266,913 B1 * | 7/2001 | Akiba et al. | 43/24 |
| 6,334,272 B1 * | 1/2002 | Akiba et al. | 43/24 |

* cited by examiner

*Primary Examiner*—Essama Omgba
(74) *Attorney, Agent, or Firm*—Michael J. Tavella (57) ABSTRACT

A repair kit for fishing rods that has a replacement tip and a coupler to repair the shafts of the broken rods. The kit can be carried in the field as part of regular tackle box. The replacement tip is a formed body that has a threaded end. The ferrule is formed as part of the body so that is not susceptible to breakage. The ferrule can be also lined with a ceramic eyelet that reduces friction on the line passing through it as well as adding strength. The coupler is a two ended-part that has two formed tapered threads or two formed metal inserts inside the coupler. The coupler is twisted onto the end of the broken rod until it is secure. The other end of the broken rod is then twisted into the open end of the coupler. Once the second end of the rod is secure, the rod is again ready to use.

1 Claim, 10 Drawing Sheets

Figure 11

METHOD OF REPAIRING A FISHING ROD

CROSS REFERENCE TO RELATED APPLICATIONS

This application is a division of application Ser. No. 10/794,069, now U.S. Pat. No. 7,225,581 filed Mar. 4, 2004.

STATEMENT REGARDING FEDERALLY SPONSORED RESEARCH AND DEVELOPMENT

Not Applicable

BACKGROUND OF THE INVENTION

1. Field of the Invention

This invention relates to repair kits for fishing rods and particularly to repair kits for fishing rods that use threaded connectors.

2. Description of the Prior Art

Fishing is a sport enjoyed by a large number of people. Millions of fishing rods and assorted tackle are sold every year. Many of the fishing poles break because of mishandling, catching too large a fish, or many other reasons. Once the pole is broken (either at the tip or along the length of the body, it is useless. Typically, pole breaks occur in the field, where repair facilities are rare. As a result, many of these broken poles are discarded in the field, cluttering up the outdoors. Even if the poles are discarded properly, they constitute more trash in already limited landfills.

One U.S. Patent has been issued coving a fishing rod rip. Design Pat. No. D368,295 shows a small tip that has a cylindrical end that fits on the pole. The end then necks down to a conical shape. An angled member extends upward and a simple ring to which a ferrule is attached. While this tip can be used for repairs, it has some problems, the biggest of which is that the ferrule is simply a ring attached to a thin member. This is a point of weakness that can fail, resulting in a second broken tip.

U.S. Pat. No. 4,860,485 teaches a tip for a fishing rod that is about four to 10 inches long. Although the tip can be used for repairs, it is primarily designed to be used with the base section of the pole to convert it into an ice-fishing pole. The device is designed to fit into a female ferrule on a rod. It uses a set of O-rings to hold the tip in place. As noted above, the device can be used as a "repair". However, since most breaks occur either at the tip of the end portion or in the body of the end portion, if this device was used as a repair kit, it would still result in many parts of the poles being dumped or abandoned in the field. Moreover, the device's length does not lend it to be carried as part of a repair kit.

BRIEF DESCRIPTION OF THE INVENTION

The instant invention overcomes these problems. It is a repair kit that has a replacement tip and a coupler to repair the shafts of the broken rods. The kit can be carried in the field as part of regular tackle box. The parts are lightweight and self-contained. They need no tools to make the repairs. Moreover, the repairs produce a rod of similar strength and flexibility as the original.

The kit has two main parts: a replacement tip and a coupler (of course more of these parts can be provided in the kit). The replacement tip is a formed body that has a threaded end. The ferrule is formed as part of the body so that is not susceptible to breakage. The ferrule is also lined with a ceramic eyelet that reduces friction on the line passing through it as well as adding strength. The coupler is a two ended-part that has formed tapered threads inside formed from molding or casting the part, or a tapered threaded metal piece inserted inside. The coupler is twisted onto the end of the broken rod until it is secure. The other end of the broken rod is then twisted into the open end of the coupler. Once the second end of the rod is secure, the rod is again ready to use. In this way, damaged fishing rods can be easily repaired in the field, which allows a user to continue fishing without difficulty as well as eliminating waste and trash from the wilds.

DETAILED DESCRIPTION OF THE INVENTION

Referring now to FIGS. 1-4, the first components of the system is the replacement tip 1. The replacement tip 1 is designed to fit over a broken tip of a fishing rod. The replacement tip 1 has a horizontal tube portion 2 and an angled eye portion 3. The horizontal tube portion 2 is a cylinder that has one open end. The inside of the horizontal tube portion 2 is threaded with a series of threads 4 (see FIG. 4). In the preferred embodiment, the replacement tip 1 is made of plastic. However, the tip may also be formed in metal or cast in ceramic, if desired. The threads formed in any of these materials are designed to adhere to the fiber material from which today's fishing rods are made.

Figure 1:
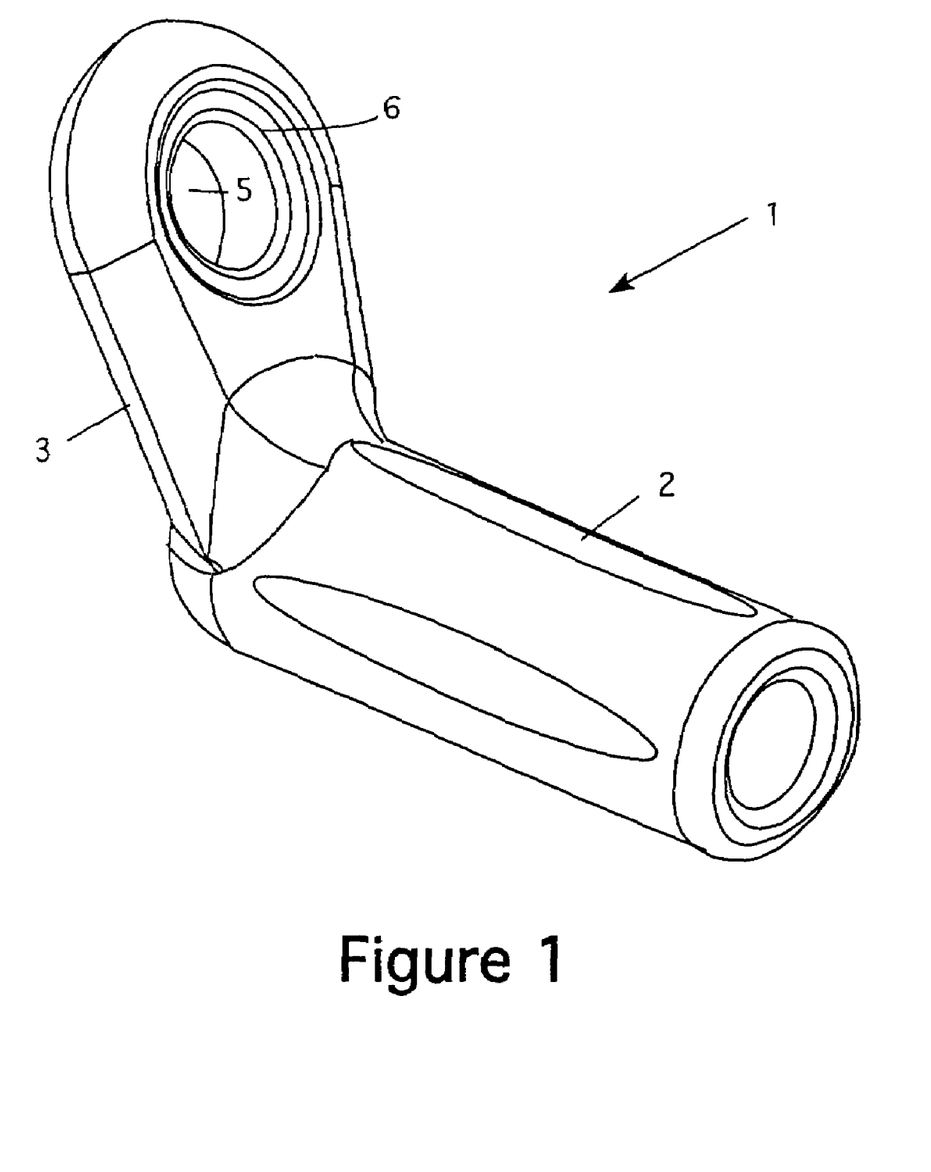
FIG. 1 is a forward perspective view of the tip replacement part of the invention.
Figure 2:
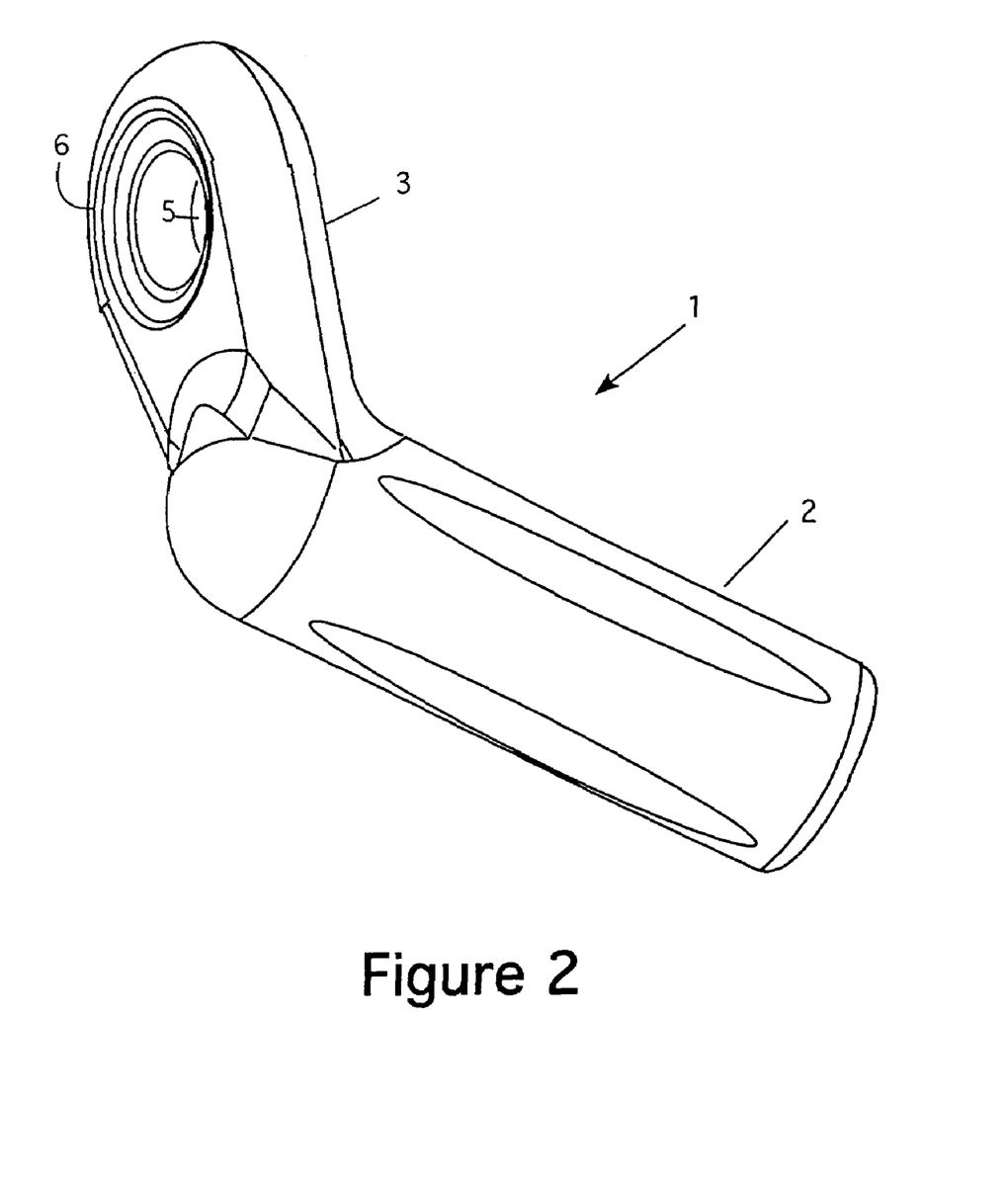
FIG. 2 is a rearward perspective view of the tip replacement part of the invention.

At the other end of the horizontal tube portion 2 is the angled eye portion 3. Unlike the prior art tips, which have a ring held by a thin strip of material, the replacement tip 1 of this invention has an eye that is formed of a relatively large mass of material, which is formed as part of a continuous structure with the horizontal tube portion 2. This solid continuous structure produces a strong tip that is less likely to bend or break after repeated use. A hole 5 is formed in the center of the angled eye portion 3 as shown. In the preferred embodiment, the hole 5 is reinforced with a ceramic eyelet 6. The ceramic eyelet 6 adds strength to the hole 5 and provides a smooth, low friction surface for the fishing line.

Figure 3:
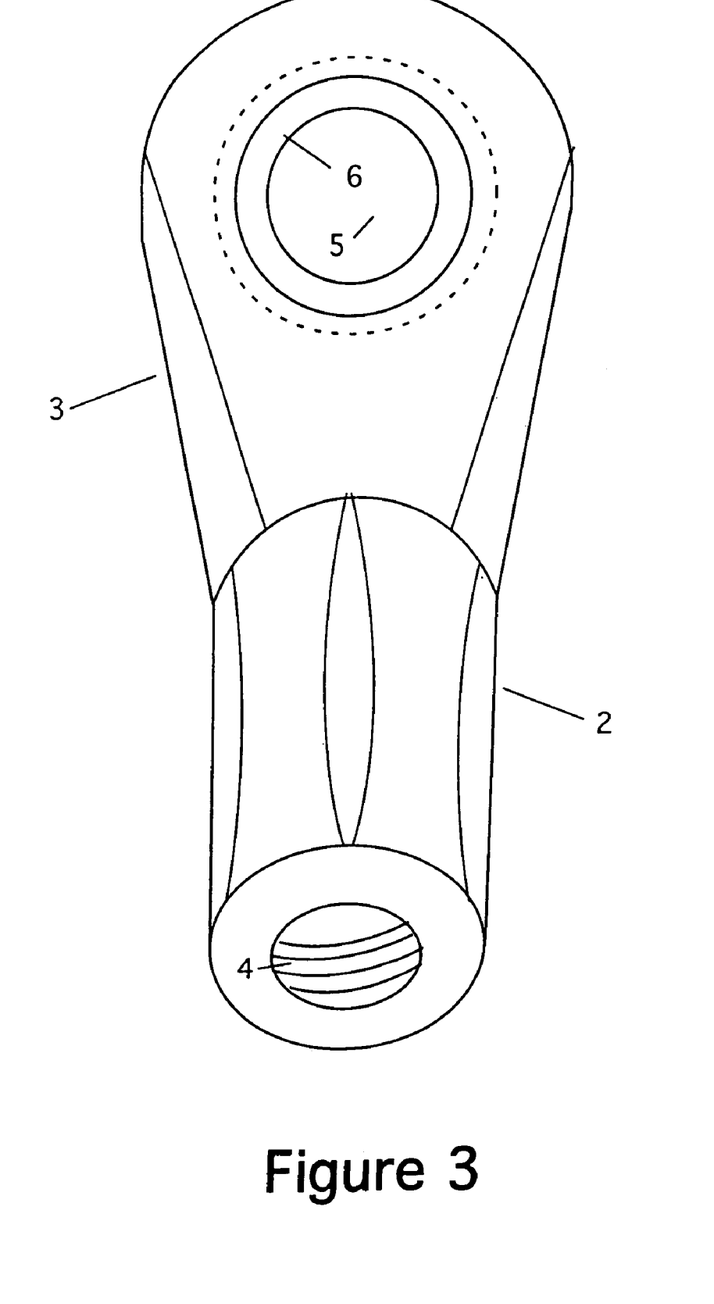
FIG. 3 is a top plan view of the tip replacement part of the invention.

FIG. 3 shows the threads 4 as well as the hole 5 and ceramic eyelet 6 from an end view.

Figure 4:
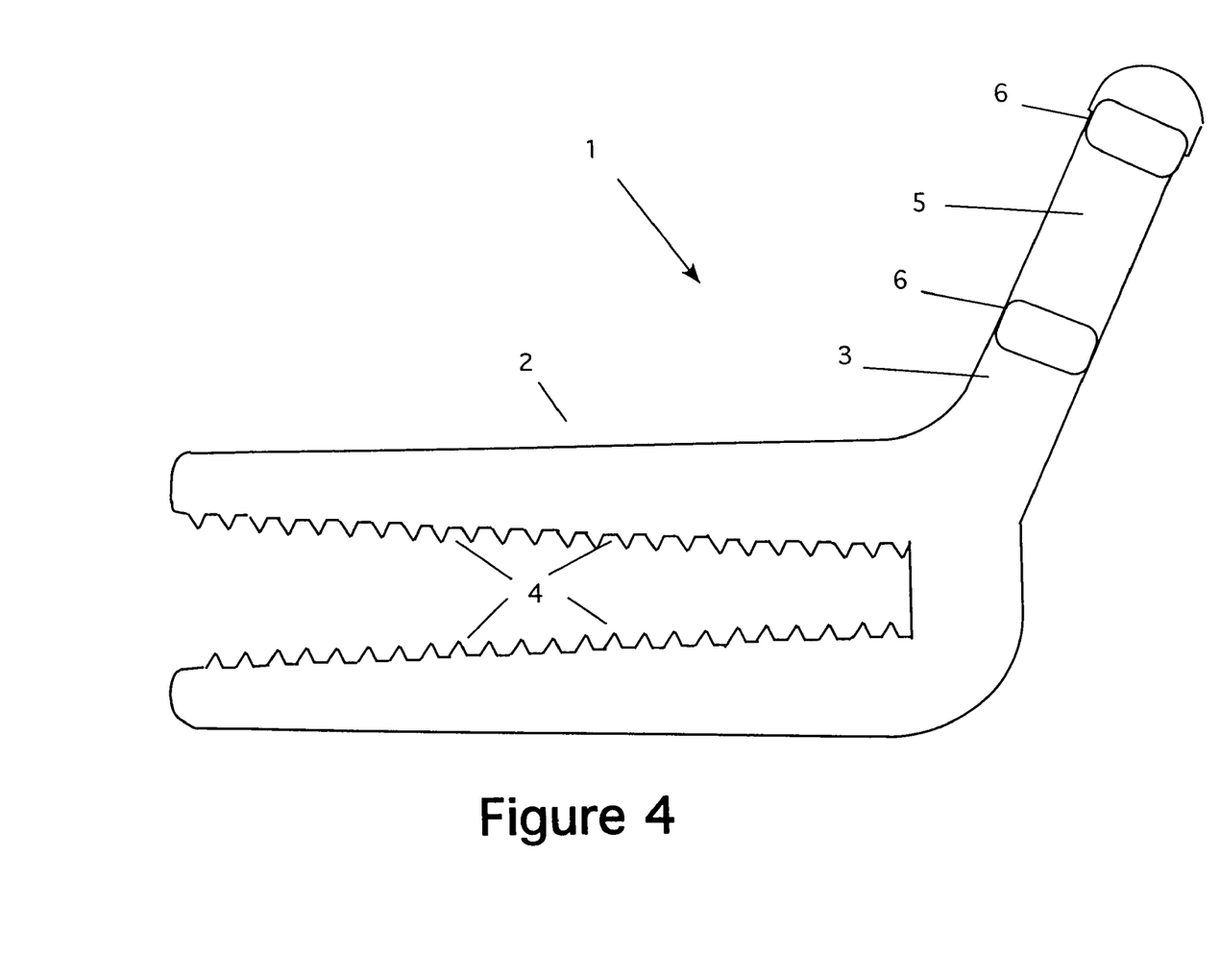
FIG. 4 is a side cross-sectional view of the tip replacement part of the invention.

FIG. 4 shows a cross-section of the device showing the internal threads 5, the solid structure between the horizontal tube portion 2 and the angled eye portion 3, and the ceramic eyelet 6.

The replacement tip is used by cleaning a broken end of a fishing rod, placing the replacement tip 1 on the cleaned end, and screwing the replacement tip onto the end until it is fully seated on the rod. Once the hole 5 is aligned with the other fishing line guides on the rod, the rod is ready for use.

Figure 5:
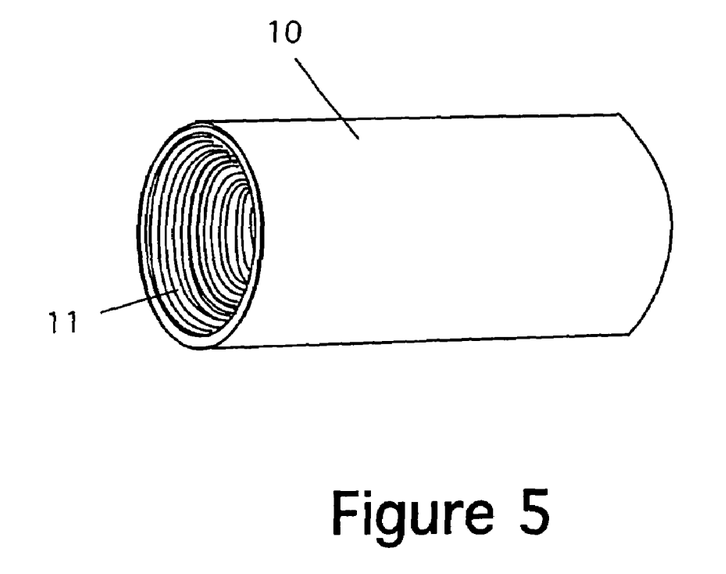
FIG. 5 s a perspective view of the coupler part of the invention.
Figure 6:
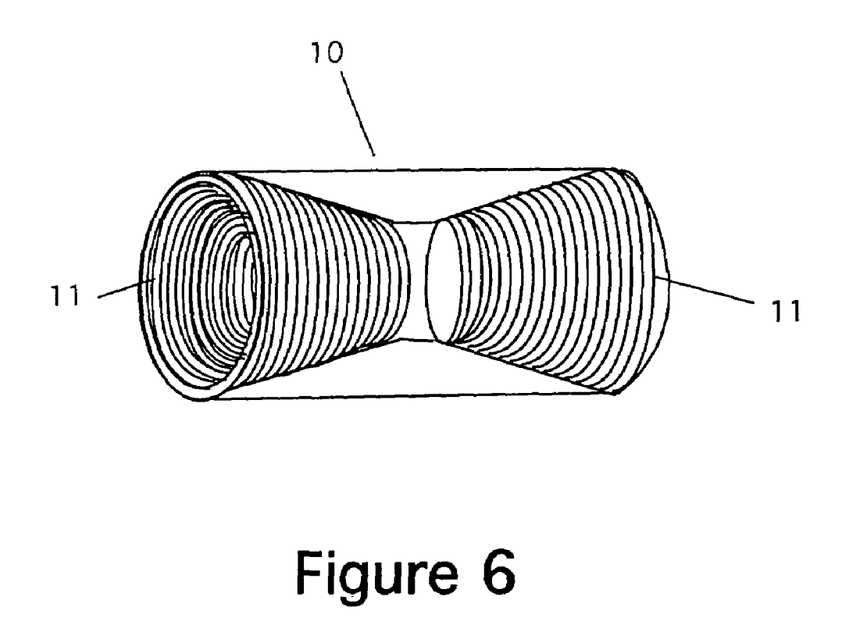
FIG. 6 is a perspective x-ray view of the coupler part of the invention.

The second part of this invention is a repair coupler 10. This component is used to make repairs on the body of the rod. FIG. 5 shows a perspective view of the coupler 10. FIG. 6 shows an "x-ray" view of the coupler 10, showing the internal components. The coupler 10 is a cylinder that is open at both ends. A pair of tapered threaded portions 11 is inside the cylinder as shown. The tapered threaded portions 11 can be threads formed during molding or casting or a pair of tapered, threaded metal pieces inserted into the cylinder. In the preferred embodiment, the threaded portion 11 is formed by plastic injection molding.

The tapered threads act to grip down on the rod material to ensure the splice formed by the coupler holds under all conditions.

Figure 7:
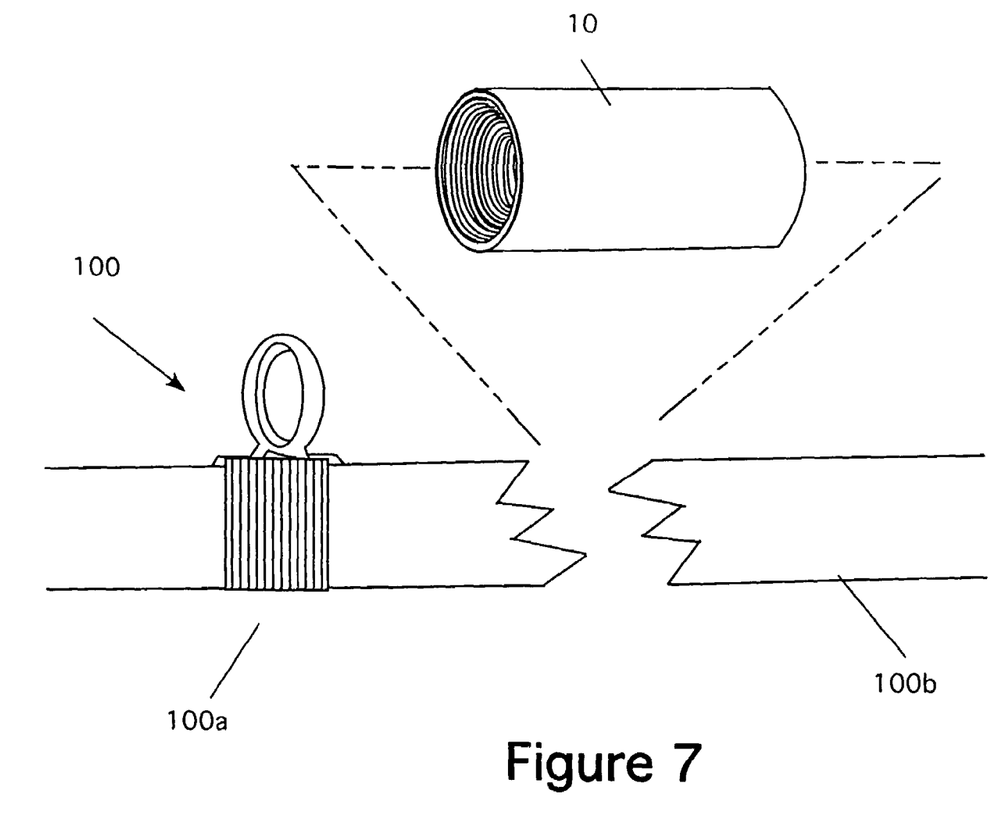
FIG. 7 is a detail view of the coupler part of the invention shown in preparation of a repair with a portion of a broken fishing rod.

FIG. 7 shows the coupler above a broken rod 100. The rod has two pieces—100a and 100b. In the preferred embodiment, the coupler components come in different diameters to enable repairs to be made anywhere on the rod.

Figure 8:
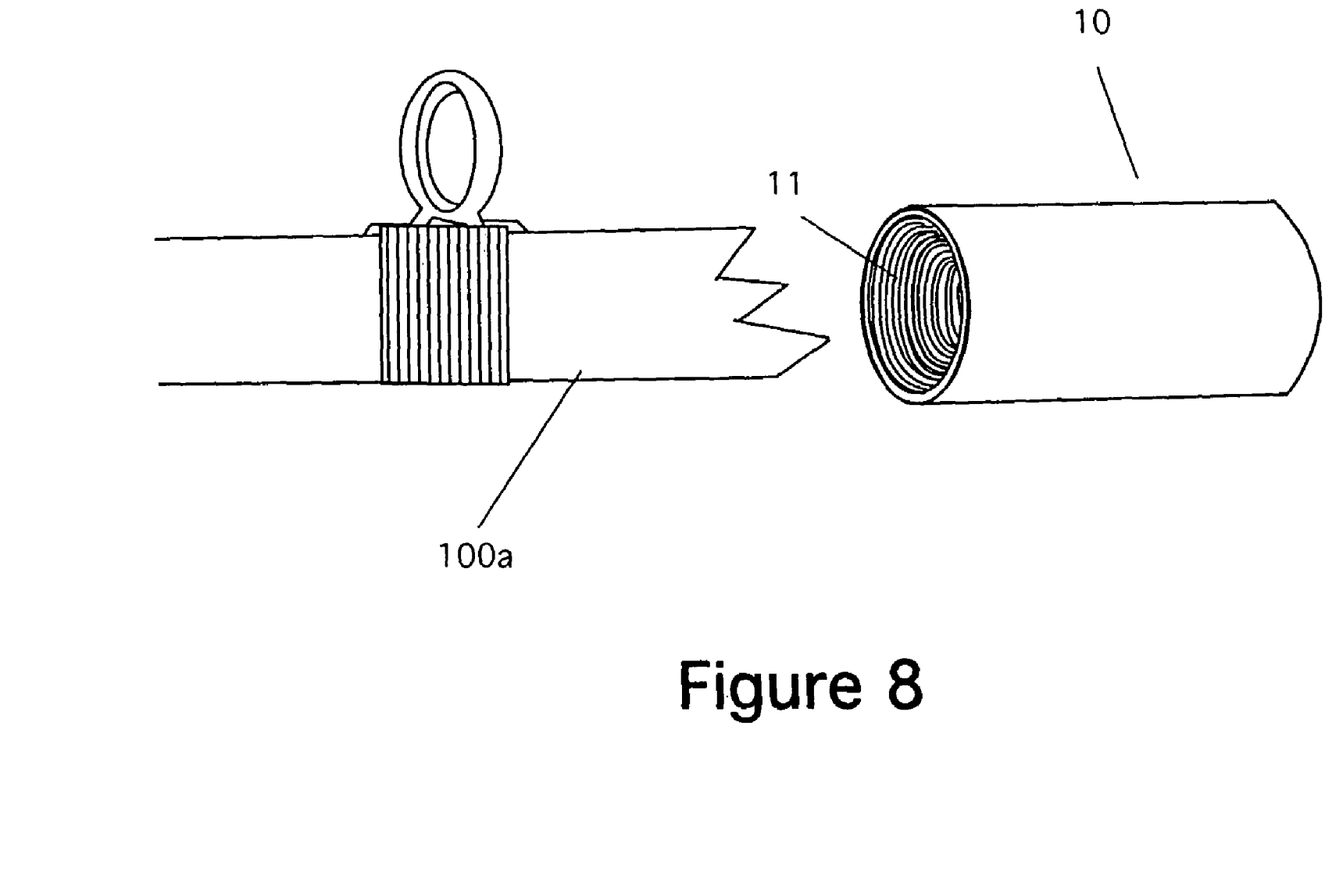
FIG. 8 is detail view showing the coupler part of the invention aligned with one part of a broken fishing rod.
Figure 9:
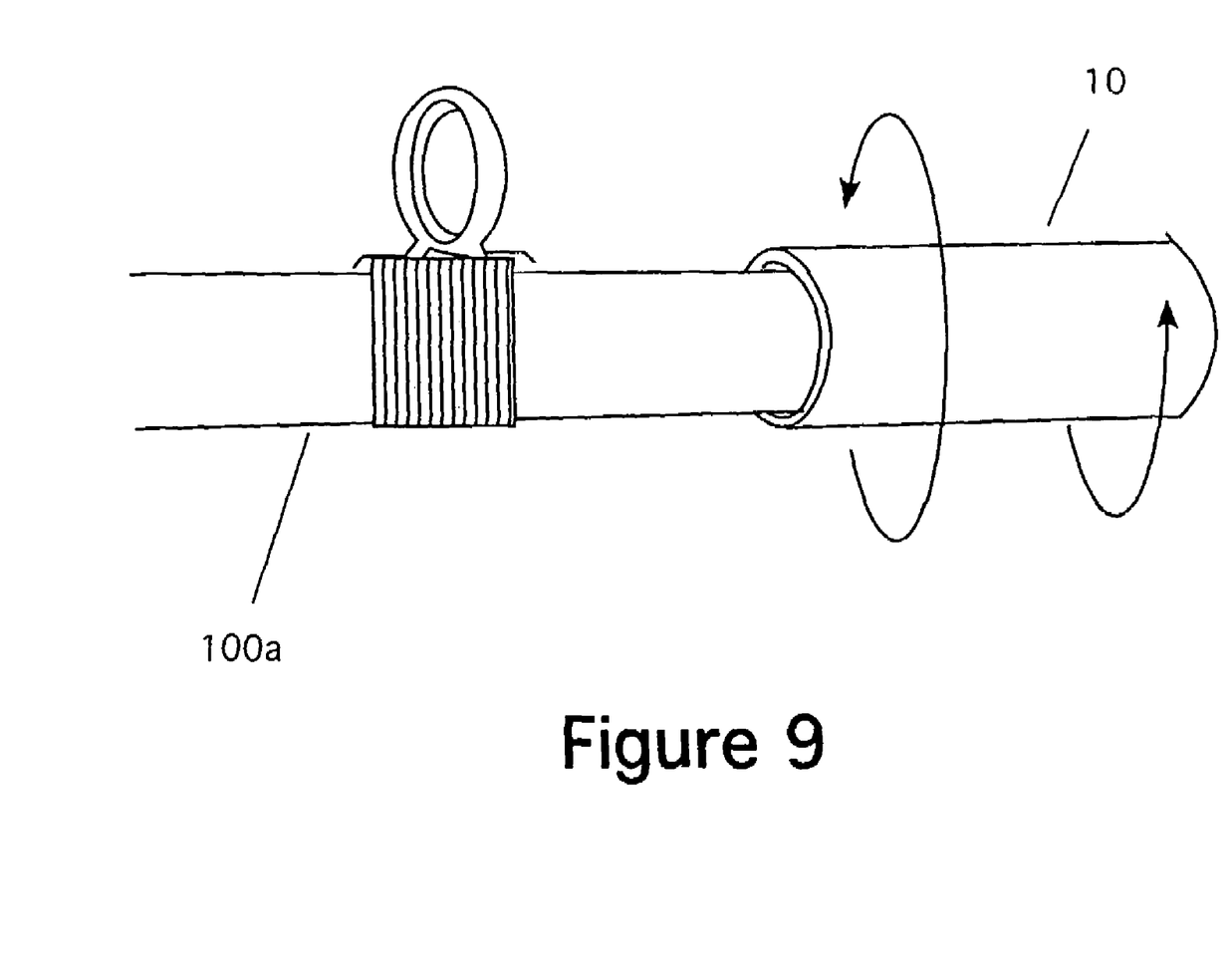
FIG. 9 is detail view showing the coupler part of the invention being twisted onto the broken portion of the fishing rod.
Figure 10:
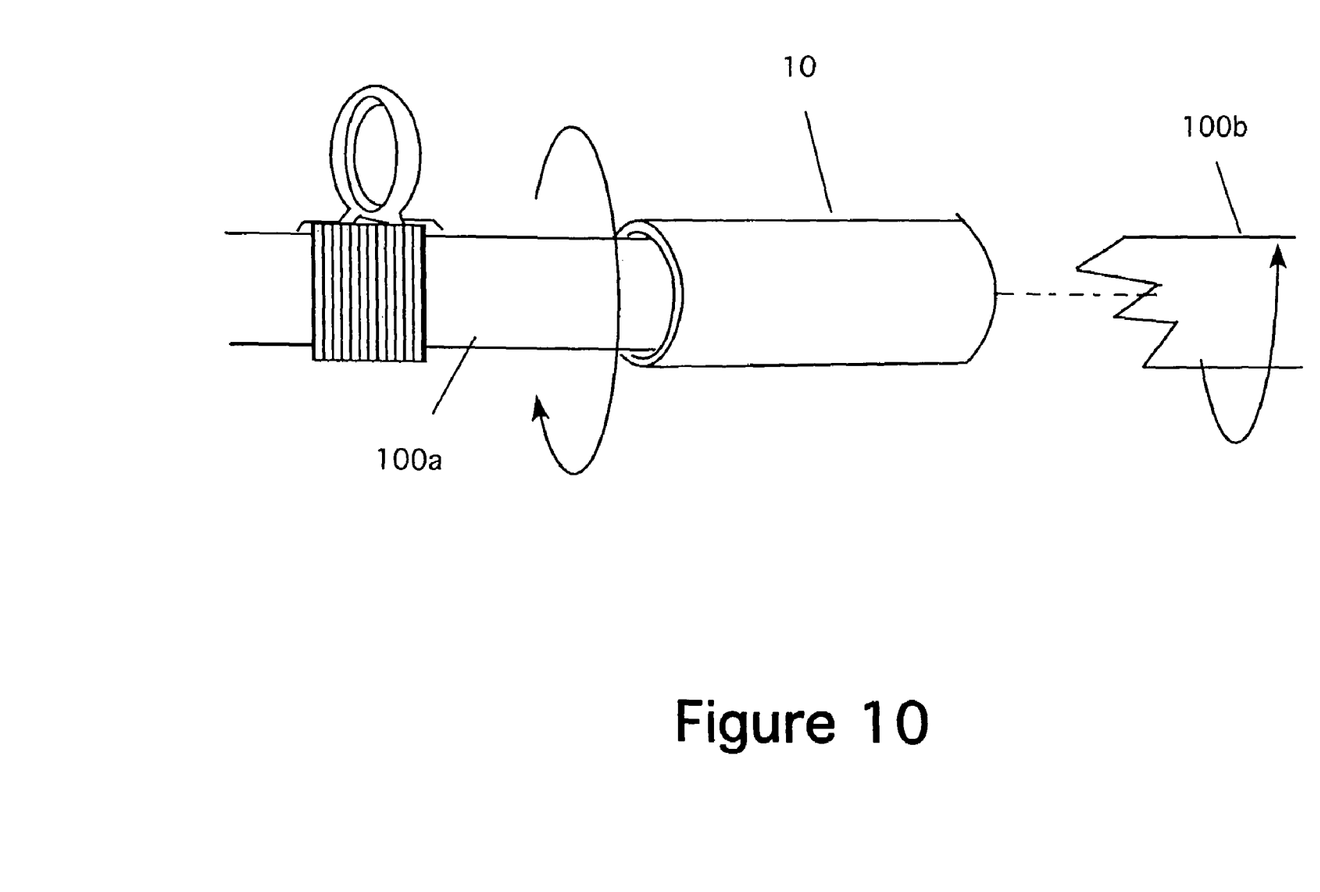
FIG. 10 is a detail view showing the second portion of the broken fishing rod aligned with the coupler and being turned to fit into the end of the coupler.
Figure 11:
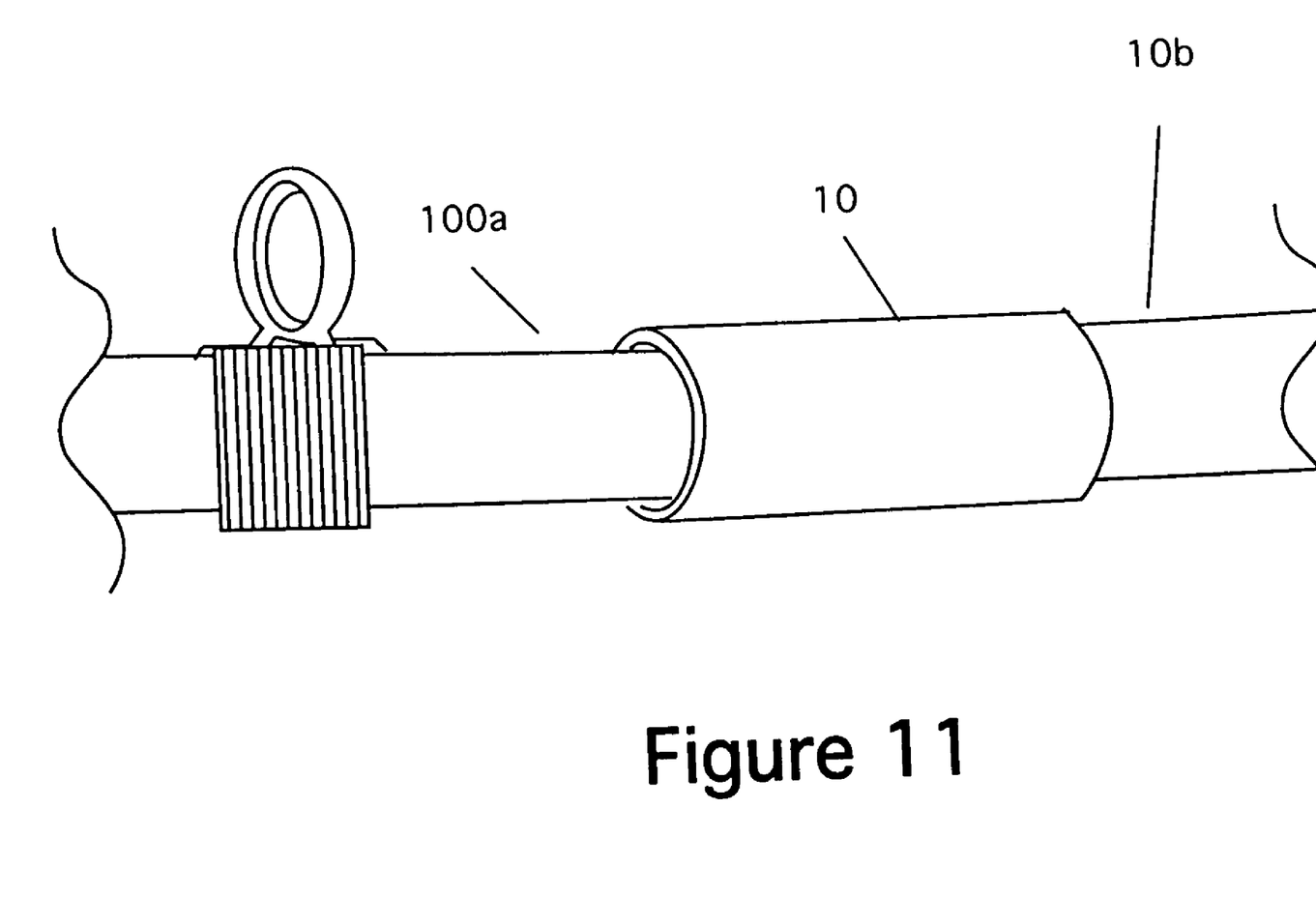
FIG. 11 is a detail view showing the repaired fishing rod with the coupler in place.

FIG. 8 shows the coupler 10 aligned with rod piece 100a. FIG. 9 shows the coupler 10 being screwed onto the rod piece 100a. FIG. 10 shows the rod piece 100b aligned with the other end of the coupler 10. This figure also shows that the rod piece 100b is rotated in the opposite direction from the rod piece and coupler combination from the previous step. Finally, FIG. 11 shows the completed repair. The rod is now reassembled with the coupler and is ready to use.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A method of repairing a fishing rod having a broken tip and a broken shaft, having a first portion and a second portion, and a plurality of eye ferrules, comprising the steps of:
   a) cleaning the edge of said broken tip;
   b) screwing a fixture having a threaded lower portion and an angled eye portion having an hole therein, onto said broken rod tip by twisting said fixture to engage said threaded lower portion with said broken rod tip; and
   c) aligning said hole in said angled eye portion to the eye ferrules on said fishing rod.

\* \* \* \* \*